3,261,127
PREVENTION OF SOIL CRUSTING
Richard L. Ferm, El Cerrito, and Charles E. Moran, Berkeley, Calif., assignors to Chevron Research Company, a corporation of Delaware
No Drawing. Filed July 15, 1963, Ser. No. 295,230
6 Claims. (Cl. 47—58)

The present invention relates to a treatment of soil to prevent crusting thereof and thus to promote and to facilitate emergence of seedlings in agricultural practice, particularly in the truck farming and gardening practice. It is furthermore concerned with particular materials employed in carrying out this treatment.

Soil crusting constitutes a serious, constantly occurring problem in agriculture. The term "soil-crusting" denotes the loss of structure by the surface of the soil in which seeds have been planted and sowed, so that, instead of presenting a loose surface of soil particles, offering virtually no resistance to the emergence of sprouting seeds, the soil particles become cemented together by clayey constituents of the soil into a hard surface layer or crust which often cannot be penetrated by tender, sprouting plants at all, or, even though finally penetrated, causes appearance of unsatisfactory, stunted non-uniform crop stands. When the original soil is formed of large particles, the crusting problem (formation of a hard, unyielding crust on top of the soil surface) is generally reduced to the minimum. However, where soil particles are comparatively small and the soil contains substantial proportions of clay, silica or sand, crusting becomes a problem of major importance.

Actually the phenomenon of crusting occurs by reason of the deflocculation of the surface soil, when the seeds have been sowed in a wet soil or in a dry, broken up and/or plowed soil, which is subsequently wetted; and by reason of the re-agglomeration of the thus dissociated (deflocculated) soil particles into a continuous hard layer or crust.

The cause of this re-agglomeration is due to the combined effects of many phenomena, the immediate one being evaporation of water which is accelerated by variation of temperature and action of the wind. Formation of the soil crust interferes with and often completely precludes plant emergence and normal healthy growth of the seedlings. Germinated, sprouted seedlings being unable to penetrate substantially simultaneously through the overlying hard crust, uneven and weak crop stands result. If crusting is extremely severe, the consequence may be a complete loss of the crop. When uneven, delayed emergence of seedlings and, as a result, non-uniform development and ripening occur, for instance, in the case of lettuce, hand labor must be sent out repeatedly to harvest the unevenly maturing crop. Obviously, this increases operating costs of the grower and the price to the consumer.

In many instances where the crusting actually stunts plant emergence, about the only remedy heretofore was to replant the whole field. This often happens in the case of tomatoes, sugarbeets or lettuce, and, of course, replanting delays the schedule of commitments to furnish by a certain date a particular kind of vegetable produce. Moreover, in the fall, the requirements of replanting may increase the risk of damage by frost or rain with a consequent lower yield and may force sales at a lower price with a loss to the grower. Also, replanting may be responsible for a lower yield because of the shortened growing season. Furthermore, replanting is, as a rule, accompanied by considerable compaction of the soil, which, as it is well known to farmers, almost invariably results in a lower yield. Quite often it is necessary to replant with a lower value crop at a substantial economic loss.

Overseeding in order to overcome the adverse effect of crusting is not always satisfactory. This practice is likely to engender propagation of seedling diseases. Furthermore, e.g., in the case of cotton, it may necessitate additional expense for thinning out either by hand labor or by machines.

Control of crusting by additional irrigation is likewise fraught with a number of drawbacks: besides the added cost of such irrigation, an overly wet soil is apt to induce occurrence of plant diseases, to cause leaching out of fertilizers and herbicides, and to promote weed growth. The weeds must then again be removed at an additional expenditure for labor and/or chemicals.

Resort to mechanical means, such as rolling equipment, to minimize crusting does not prove to be very satisfactory either. In order to combat occurrence of crusting effectively, the beds must be rolled immediately before emergence of the seedlings, and it is often impossible to get equipment into the field to do this when the soil is wet. The same handicap is present when resorting to raking or scratching. Also, in the course of this raking or scratching of the seedbeds the seedlings are often damaged. In any event, the resulting crop stand, following the application of such mechanical means, is often incomplete and unevenly spaced.

Another technique for minimizing the damage to the crops by soil crusting consists in the application of gypsum which displaces sodium ions whose presence is known to aggravate the formation of crust. However, application of gypsum is accompanied by compaction of the soil with a consequent decrease in yield and is often ineffective because of the pH of the particular soil. Moreover, because of the whiteness of gypsum, the soil is cooled and thus sprouting of the seed is delayed.

It is found now that by treating the soil with an aqueous emulsion of a particular kind of synthetic hydrocarbon polymers crusting can be drastically minimized, if not virtually eliminated, obviating the expenses and disadvantages involved in previously practised techniques and assuring an early and uniform emergence of seedlings, their vigorous growth and maturing, and thus providing improved yields which mean an increased revenue to the farmer.

The particular synthetic hydrocarbon polymers are liquid polybutenes which are produced by catalytic polymerization of normal and branched-chain butenes and are characterized by average molecular weights in the range from about 900 to about 2800.

Oil-in-water type emulsions of polybutene found to be effective in suppressing the crusting of soil, which may therefore be designated as "anti-crusting" compositions or emulsions, are prepared by emulsifying polybutenes with average molecular weights ranging from about 900 to about 2800, and having viscosities from about 40,000 to about 9000,000 SSU at 100° F., in water with the aid of a surface-active agent to form emulsion concentrates which contain from 50–70% and preferably from 55–65% by weight of polybutene.

A particularly desirable "anti-crusting" composition for most practical purposes is one containing about 60% by weight of polybutene. Liquid polymeric materials registered under the trademark designations of "Oronite Polybutenes" Nos. 24, 32, 64, 122 and 128 are eminently suitable for the preparation of "anti-crusting" compositions of the present invention.

Owing to the precise narrow molecular weight distribution for each grade of these last-named polybutene materials, and determined by their dispersion indexes, i.e., by the ratio of the weight average molecular weight to the number average molecular weight, they possess superior properties, in particular, higher flash points, lower weight loss through evaporation, etc. See bulletin, "New Improved Oronite Polybutenes," published and copyrighted by California Chemical Company in 1963. The dispersion indexes of these preferred and particularly effective polybutenes range from about 1.5 to about 2.5.

Generally speaking, any kind of emusifier in amounts sufficient to produce stable oil-in-water type dispersions (emulsions) of polybutenes may be used. However, non-ionic and cationic emulsifiers will be used in preference to anionic emulsifiers in the preparation of polybutene emulsions for the prevention of soil-crusting, because of the tendency of anionic emulsifiers to react with hard water and to precipitate insoluble (calcium and the like) soaps. The formation of these soaps may at times cause a premature breakdown of the emulsion and fouling of the equipment used to apply the emulsion in the field or garden. Employment of cationic and non-ionic type emulsifiers for the preparation of anti-crusting emulsion compositions does not involve this risk.

Particularly effective emulsifiers are those of the non-ionic type, for instance, water-soluble polyoxyalkylene ethers of alkyl phenols (alkylphenyl polyglycol ethers) containing from 9 to 16 carbon atoms in the alkyl portion. The alkyl chains in these materials may be either straight or branched. Also very effective as emulsifiers are fatty acid esters of anhydrosorbitols, rendered water-soluble by etherifying the free hydroxyl groups with ethylene oxide.

As an illustration of the aforementioned preferred ethers of alkyl phenols there may be mentioned a liquid alkyl phenyl polyoxyethylene ether dispersant sold under the trademark "Dispersant NI–W." In this material the alkyl chain contains an average of 12 to 14 carbon atoms, the number of ethylene oxide units to impart water-solubility being in the range from 8 to 12. As an illustration of the preferred etherified fatty esters of anhydrosorbitols, one may mention a non-ionic polyoxyethylene sorbitan monostearate sold as an emulsifying agent under the trademark "Tween 60." These last-mentioned esters are particularly satisfactory when used in combination with a small amount of a coupling agent, such as glycerol or a hydrogenated $C_{18}$ (lard) monoglyceride, to improve emulsion stability.

As illustrations of suitable effective cationic emulsifiers for the preparation of polybutene emulsions for use in the prevention of soil crusting, there may be mentioned water-soluble, surface-active quaternary ammonium salts, such as the material sold under the trademark of "Arquad T," as well as acid salts of fatty diamines, for instance, the materials sold under the trademarks of "Duomeen T," and of "Formonyte 802."

The quantity of the emulsifier employed in the manufacture of these "anti-crusting" emulsion concentrates of polybutenes may range from about 0.1 to as high as 10% by weight, and preferably from about 1 to about 6% by weight. The emulsification may be carried out in any known manner. Thus from 50 to 70% by weight of an effective liquid polybutene, such as "Oronite Polybutene No. 32," may be readily emulsified in conventional equipment, for instance, in an ordinary mix-pot provided with a blade stirrer, using from about 3 to about 6% by weight of a non-ionic emulsifier, such as the aforementioned "Dispersant NI–W." If lesser amounts of the emulsifier are employed, a colloid mill may be necessary to obtain stable emulsions of polybutene, suitable for anti-crusting treatment of the soil. "Oronite Polybutene No. 32" with an average molecular weight between about 1100 and 1400 is a particularly desirable material for the prevention of crusting.

Fresh water should preferably be used for making the emulsion concentrates of the invention, lest hard water or brackish water affect emulsion stability and cause emulsion breakdown prior to the actual application in the field.

The application of the emulsified polybutene compositions of the invention to the surface of the soil, in which seeds have been previously sowed, results in leaving thereon, after evaporation and drainage of the aqueous phase, a thin layer or film of polybutene. However, because of the high viscosity of these particular polybutenes, they stay on the surface of the soil, whether as a continuous band or a regular sequence of spots, thus preventing agglomeration of the soil particles into a crust. At the same time the permanently fluid nature of these polybutenes, applied as a very thin layer, allows easy penetration by sprouting seeds and eliminates stunting of young seedlings.

The treatment of the soil to prevent crusting may be carried out with any conventional spraying equipment used in agriculture for distributing insecticides and/or herbicides over the seedbeds, for instance, by spraying the emulsion as a continuous band 2–8″ wide; or yet by applying it manually from spray cans. Also, the emulsion may be distributed with excellent results using the pulsating-type spraying apparatus described in a copending application Serial No. 294,897, filed on July 15, 1963, by Ferm, Smith and Moran. The applicating equipment may be mounted directly onto the seeding equipment, so that no additional passes through the field need be made. A consequent saving in labor and fuel as well as reduction of soil compaction is thus realized.

In actual practice, one need not use the emulsion concentrate undiluted, but would rather prefer to dilute it wtih water so as to reduce the viscosity of the sprayed liquid and thus to assure easier working of the equipment. For all practical purposes this dilution may be as low as 1:1, that is, if the concentrate contains 60% polybutene, the thus diluted liquid suitable for spraying would contain 60 parts of polybutene per 140 parts by weight of water. In some cases, one may use the concentrate as is, undiluted; for instance, the applicator (farmer) under particular circumstances may not want to go through the step of diluting the concentrate and distributing the diluted liquid in a number of storage tanks before actual use, but will prefer to use the concentrate directly. Thus, actually the quantity of polybutene, effective in anti-crusting treatments according to the invention, ranges from about 25% to about 70% by weight in the emulsion as applied.

The emulsions are applied at a rate which may result in the application of from about 0.02 gallon to about 0.12 gallon of the polybutene itself per 1 sq. yard of the soil surface. A particularly satisfactory application rate in most instances is about 0.1 gallon per 1 sq. yard of the emulsion concentrate.

The total quantity of anti-crusting emulsion to be applied is, of course, dependent on the manner of its application to the soil: obviously, more emulsion will be required if it is applied in a continuous band, say 2–8″ wide; less, if it is applied by the aforementioned technique which uses pulsating equipment to spray spots regularly spaced for each other.

The actual requirements of the polybutene anti-crusting composition per acre will depend on the spacing between the rows (seedbeds), and, with the pulsating equipment, on the distance between the sown seeds of each particular crop. Thus, for most vegetables, including lettuce, where rows are spaced about 20″, an average of about 6 gallons per acre of the emulsion concentrate (about 60% by weight of "Polybutene No. 32") would be required. For sugar beets and lima beans, this quantity will be about 1 to 1.5 gallons less per acre. Cotton fields may be sufficiently protected by applying an average of only 3 gallons per acre, while tomatoes or melons will need only from 2 to 2.5 gallons per acre for an adequate protection against soil crusting where the pulsating method of application is used.

The following are typical examples which illustrate the improvement in crop yields due to the application of anti-crusting polybutene emulsions in accordance with the invention.

Example I

In this case the anti-crusting treatment was carried out by spraying a lettuce field, about 25 acres in area, in Salinas, California, with an emulsion formulated as follows:

| | Percent by wt. |
|---|---|
| Oronite Polybutene 32 | 59.6 |
| Oronite NI–W | 5.4 |
| Fresh water | 35.0 |
| | 100.0 |

This emulsion concentrate was diluted with water in a ratio of 1:1 before application. The rows were spaced 40″ on centers. Two 800 ft. rows were sprayed by using tractor-mounted spraying equipment. The spraying took place immediately after the seeds were sown. Observed after 14 days, the sprayed area displayed good crust prevention, and satisfactory and uniform emergence of seedlings. In addition, two 400 ft. rows in the same field were sprayed with the same emulsion, pigmented in one case with black iron oxide and in the other case with white titanium dioxide pigment. The pigments were added in order to test their effect on soil-warming qualities. In both instances, good crust prevention was observed and a uniform healthy stand of seedlings noted. Apparently, addition of the pigment does not influence perceptibly the anti-crusting property of polybutene emulsions. In the same test, a part of the same field (two 800 ft. rows) was sprayed with an anionic emulsion of an air-blown asphalt of about 220° F. softening point. Observed after the same number of days as the polybutene-treated parts of the field, this section appeared to be without any crust-controlling film. In fact, there was considerable crusting.

Example II

In this instance two 300 ft. rows in a field near Salinas, California, seeded with lettuce (in rows 40″ apart), were sprayed with an emulsion of Polybutene No. 128, prepared similarly to the emulsion of Example I. After 15 days it was noted that crusting was well controlled and that a good stand of lettuce seedlings did emerge. Simultaneously with this anti-crusting treatment another portion of the same field (two 700 ft. rows) was treated with an emulsion of a spray oil, which was a petroleum distillation cut boiling at about 650°–700° F. and having a viscosity of 95–105 SSU at 100° F. The emulsion was prepared similarly to that of polybutene. After 15 days it was noted that the treatment had aggravated crusting and stunted emergence of lettuce seedlings.

Example III

This test near Salinas, California, illustrated the criticality of the nature of polybutene used in the formulation of anti-crusting compositions of the invention. Two 1800 ft. long rows of a field of about 30 acres in area, seeded with lettuce in rows spaced 40″, were treated by spraying them in accordance with the technique of Example I with an emulsion which has been formulated as the polybutene emulsion of Example I, but using a lower molecular weight polybutene material, namely Oronite Polybutene No. 8 of an average molecular weight of about 450. After about 10 days it was observed that in this case the crust-preventing treatment was of no avail. Instead of alleviating crusting, the application definitely appeared to contribute thereto and to destroy the original loose, penetrable soil structure.

Example IV

In this case, the anti-crusting treatment was applied on a lettuce field of approximately 20 acres. The treated portion consisted of two rows, approximately 1200 feet in length. These rows were on raised beds, 40 inches on centers. The following formulation was used:

| | Percent by weight |
|---|---|
| Oronite Polybutene No. 32 | 59.6 |
| Oronite NI–W | 5.4 |
| Fresh water | 35.0 |
| | 100.0 |

This was again the concentrated emulsion which was subsequently diluted in a ratio of 1:1 with water before application as in Example I. Application was made both in 4-inch wide bands and in spots 2 inches in diameter over the seed rows.

The location of this trial was in the vicinity of Soledad, California. The field consisted of the soil type designated as Salinas clay. Irrigation was by sprinkling, approximately 2 to 3 inches of water being applied to the soil.

Approximately 21 days elapsed from the time of application until the observation of the test results. At the time of observation, it was noted that the untreated portion of the field had crusted badly, requiring the grower to "roll" the seedbeds in order to break the crust. The rows which were treated with polybutene did not crust. Comparison of the treated rows with the control rows revealed an emergence ratio of about 70 vs. 7 plants per 10 feet of rows. Greater maturity was clearly apparent in the plants in the treated rows.

Example V

The polybutene emulsion formulation in this example was the same as in Examples I and IV. Again, 1:1 dilution with water was made before application.

This treatment was applied on cotton in a field approximately 160 acres in size. The length of the treated rows was about 300 feet on raised beds, 40 inches on centers.

The location of the trial was near Westhaven, California, the soil being clay loam.

Furrow irrigation was employed before planting. A rain which fell after planting resulted in extensive crusting throughout the field.

Observations made at about emergence time revealed that the seedlings in the treated rows emerged about 4 days earlier than those in the untreated areas. Some 20 days after the treatment it was noted that no crust had formed in the treated rows, even though intermittent rains had created a constant crusting problem throughout the rest of the field.

Example VI

This treatment was made on a tomato field near King City, California. The treating material again was the same as in Example I, diluted with water in a ratio of 1:1 before actual application.

The tomato field was approximately 20 acres in extent; the treated rows were about 500 feet long on raised beds, 76 inches on centers. The field consisted of Lockwood gravely loam.

A 3-inch rain on the field after planting and before emergence created a severe crusting problem. Observations on the field 15 days after the treatment showed a significant difference in emergence and maturity between the plants in the treated rows and the untreated rows, and a definitely superior stand due to the application of the polybutene emulsion.

Example VII

The treatment in this case was on melons and utilized the same material as in Example I, similarly diluted with water (1:1 ratio). The field size was somewhat greater than 30 acres. The treated rows were approximately 500 feet long with 72 inches between rows.

The trial field was located near Mendota, California, and was of a silty, clay loam. Treatment was by both the banding and spotting methods.

Approximately 20 days after treatment, during which time the field had received intermittent rains, it was noted that emergence of seedlings was very good in the treated rows, but quite poor and spotty in the untreated areas. Plant counts over 30 feet of row revealed 109 in the polybutene-treated rows as against only 9 in the untreated rows.

*Example VIII*

Again, a carrot field, approximately 15 acres in extent, was treated, using the same material as in Example I, similarly diluted. The treated rows were 800 feet long on raised beds, 40 inches on centers. The field was of a very fine, sandy loam located near Soledad, California. Sprinkler irrigation applying an average of about 2 to 3 inches of water over the field resulted in the usual crusting problems.

Observations approximately 13 days after the polybutene treatment revealed significantly greater emergence in the treated areas, giving 139 plants in the treated rows as compared with 77 in the untreated rows over a distance of 10 feet. Treatment in this case was by banding only.

*Example IX*

The treatment in this case was on a field of spinach approximately 10 acres in size. The treated rows were about 800 feet long on raised beds, 40 inches on centers. The field was near Gonzales, California, and consisted of silty, clay loam. The treatment was by 4-inch bands and utilized the same polybutene material (diluted) as in Example I. The field was irrigated by sprinkling and also received rain before emergence. This resulted in severe crusting. The field had to be resprinkled to soften the crust. However, the treated area which was not resprinkled showed outstanding degree of emergence and greater maturity.

*Example X*

In this case a 15-acre field of broccoli was treated with the same polybutene emulsion (diluted) as in the previous examples. The untreated rows were about 600 feet long on raised beds, 40 inches on centers. The trial was located near Salinas, California, on silty, clay loam. Irrigation was by sprinkling with about 2 to 3 inches of water which resulted in the usual crusting problem. About 20 days after the treatment by both bands and spots, it was observed that excellent emergence and maturity had been obtained in the treated area, but that the rest of the field had to be "rolled" in order to attain adequate emergence of the crop.

*Example XI*

The emulsified polybutene applied in this treatment was the same as in the foregoing examples (same dilution). The treatment was by band and spot method on a 15-acre field of cauliflower, near Salinas, California. The treated rows were about 200 feet long on raised beds, 40 inches on centers. The field was one of silty, clay loam. Again irrigation was by sprinkling with from 2 to 3 inches of water.

About 20 days after the treatment, it was observed as in the other examples, that the treatment had allowed emergence of the crop without resort to rolling and had resulted in a greater number of plants emerging and in greater maturity.

*Example XII*

This trial, again using the same material as in the previous examples, was on a 50-acre sugar beet field near Chualar, California, on sandy, loam soil. The treated rows were about 4000 feet long on raised beds, 40 inches on centers. Water was applied by furrow irrigation. However, a rain before emergence created a severe crusting of the soil in the untreated area. A plant count made about 36 days after the polybutene treatment revealed that, over 10 feet of row, 102 seedlings had emerged in the treated rows, whereas only 55 had emerged in the untreated rows.

The method of applying polybutene emulsions according to the present invention can also be utilized successfully in establishing new lawns in public parks as well as around buildings and private homes. As soon as seeds have been sowed and the soil raked lightly, the emulsions may be applied as a continuous film cover over the entire area of the projected lawn. The presence of the polybutene film not only prevents crust formation, but permits adequate watering of the lawn prior to germination without excessive loss of soil by erosion. Additional advantages in this instance are: elimination of the need of application of peat moss and exclusion of raiding of seeds by birds from the seeded area. In a typical case, an application of an emulsion of "Polybutene No. 32," such as was described in Example I hereinabove, diluted with an equal volume of water and applied with a garden sprinkling can, resulted in an excellent stand of grass (Merion bluegrass) in about a week's time.

The aforedescribed formulations of polybutene of the present invention are characterized by good stability while at rest and thus can be left in storage tanks for long periods of time, up to six months or longer, before being used for protecting the fields against soil crusting. Employment of Oronite NI-W, as an emulsifier, in particular assures good storage stability of the emulsions. "Tween"-type materials, such as "Tween 60," are also satisfactory, and any tendency of the emulsions of the invention towards phase separation can be effectively minimized by additions of coupling agents, such as the aforementioned monoglycerides and/or glycerol.

Pigments may be incorporated in the emulsions to be used in accordance with the invention, should an applicator wish to cool or to warm the soil in order to retard or to accelerate sprouting.

Numerous examples of actual field tests, additionally illustrating the effectiveness of polybutene anti-crusting compositions of the invention, could be adduced, but it is believed that the aforegiven examples are sufficient and amply demonstrate the operativeness and effectiveness of crust-prevention and the consequent benefits to yields of different crops.

In conclusion, it is to be understood that all changes, modifications and adaptations coming within the scope of the following claims are to be embraced thereby.

We claim:

1. A method of preventing the formation of a crust on the surface of soil, said method comprising distributing polybutene over the surface of the newly seeded soil, at a rate of from about 0.02 to about 0.12 gallons per one square yard of the soil surface, such distribution being made by spraying polybutene as an aqueous emulsion of from about 25 to about 70% by weight of liquid polybutene having an average molecular weight from about 1100 to about 2800.

2. The method defined in claim 1, in which the polybutene is distributed over the surface of the soil as an emulsion of from about 35.0 to about 65.0% by weight of polybutene.

3. The method defined in claim 1, in which the polybutene distributed over the surface of the soil has been emulsified in water with the aid of a water-soluble cationic emulsifier.

4. The method defined in claim 1, in which the polybutene distributed over the surface of the soil has been emulsified in water with the aid of a water-soluble nonionic emulsifier.

5. The method defined in claim 1, in which the polybutene distributed over the surface of the soil has been emulsified in water with the aid of a water-soluble nonionic polyoxyalkylene ether of alkyl phenol.

6. The method defined in claim 1, in which the polybutene distributed over the surface of the soil has an average molecular weight in the range from about 1100 to 1400.

References Cited by the Examiner

UNITED STATES PATENTS

| | | | |
|---|---|---|---|
| 2,213,477 | 9/1940 | Steindorff. | |
| 2,625,529 | 1/1953 | Hedrick. | |
| 2,651,885 | 9/1953 | Hedrick. | |
| 2,717,884 | 9/1955 | Morrill. | |
| 2,867,944 | 1/1959 | Fletcher | 47—58 |
| 2,961,799 | 11/1960 | Coe | 47—58 X |
| 3,061,974 | 11/1962 | Louis | 47—9 |
| 3,094,809 | 6/1963 | Kaufman | 47—58 |

FOREIGN PATENTS 212,372  1/1958  Australia.

OTHER REFERENCES

Condensed Chemical Dictionary, sixth edition, New York, Reinhold, 1961, pages 909–910.

ANTONIO F. GUIDA, *Acting Primary Examiner.*

T. GRAHAM CRAVER, *Examiner.*

L. J. BLACKMAR, R. E. BAGWILL,
*Assistant Examiners.*